United States Patent [19]
Wethe et al.

[11] 3,971,211
[45] July 27, 1976

[54] THERMODYNAMIC CYCLES WITH SUPERCRITICAL $CO_2$ CYCLE TOPPING

[75] Inventors: Jay D. Wethe, Whittier; William M. Waters, Glendora, both of Calif.

[73] Assignee: McDonnell Douglas Corporation, Long Beach, Calif.

[22] Filed: Apr. 2, 1974

[21] Appl. No.: 457,286

[52] U.S. Cl. .................. 60/39.18 R; 60/39.18 B; 60/655; 60/647
[51] Int. Cl.² ...................................... F01K 23/04
[58] Field of Search .............. 60/39.18 A, 39.18 B, 60/39.18 C, 39.18 R, 655, 647, 650, 651, 671, 682

[56] References Cited
UNITED STATES PATENTS

| | | | |
|---|---|---|---|
| 2,466,723 | 4/1949 | Mercier | 60/39.18 |
| 2,593,963 | 4/1952 | Biggs | 60/655 |
| 2,675,672 | 4/1954 | Schorner | 60/39.12 |
| 3,234,735 | 2/1966 | Pirsh et al. | 60/39.18 B |
| 3,237,403 | 3/1966 | Feher | 60/647 |
| 3,257,806 | 6/1966 | Stahl | 60/655 |
| 3,266,246 | 8/1966 | Heller et al. | 60/655 |
| 3,325,992 | 6/1967 | Sheldon | 60/39.18 B |
| 3,796,045 | 3/1974 | Foster-Pegg | 60/39.18 B |

FOREIGN PATENTS OR APPLICATIONS

| | | | |
|---|---|---|---|
| 547,127 | 5/1956 | Belgium | 60/39.18 B |
| 1,204,119 | 9/1970 | United Kingdom | 60/655 |

*Primary Examiner*—Allen M. Ostrager
*Attorney, Agent, or Firm*—G. W. Finch; W. J. Jason; D. L. Royer

[57] ABSTRACT

Gas turbine, steam turbine and/or process steam systems are combined with supercritical carbon dioxide cycle engines to produce major improvements in net plant efficiency by using the heat inputs and outputs of the supercritical $CO_2$ cycle to supply or remove heat in advantageous ways to the gas turbine, steam turbine and/or process steam systems.

3 Claims, 10 Drawing Figures

THERMODYNAMIC CYCLES WITH SUPERCRITICAL CO₂ CYCLE TOPPING

CROSS-REFERENCE TO RELATED PATENT

This application relates to the subject matter of U.S. Pat. No. 3,237,403 entitled "Supercritical Cycle Heat Engine" by Ernest G. Feher and reference is made to the information therein as though fully set forth hereinbelow

BACKGROUND OF THE INVENTION

The Feher Cycle Engine described in the above-referenced patent is known to offer higher cycle efficiency than more conventional thermodynamic energy conversion systems. When a Feher Cycle heat engine utilizes a combustion gas fired primary heat exchanger, the minimum combustion gas primary exhaust temperature is relatively high since it must be above the design temperature of the working fluid entering the turbine inlet of the Feher Cycle. Typically when $CO_2$ is the working fluid, this primary exhaust temperature is more than 1400°F and can be up to 3,000°F or higher. In a conventional Feher Cycle system, a portion of the heat in the exhaust gases leaving the primary heat exchanger can be utilized in an air preheater to increase the temperature of the ambient air prior to its entry into the combustion. In addition to the high temperature which must be present in the primary heat exchanger exhaust gases, there is also a high differential pressure present. Since the $CO_2$ is not allowed to fall below its critical pressure of 1072 psi and in some instances the $CO_2$ pressure in the primary heater tubes approaches 4500 psi or higher while the combustion gases are at relatively modest pressures, the Feher Cycle primary heat exchanger has a combination of high differential pressure and relatively high tube wall temperatures which make it expensive and difficult to fabricate.

Since it is the main object of Feher Cycle machines to convert heat energy into other useful forms of energy such as mechanical or electrical energy in the most efficient and economical way possible, the hereinafter described invention is aimed at making effective use of the aforementioned Feher Cycle characteristics.

SUMMARY OF THE INVENTION

It has been found that the efficiency advantages of the Feher Cycle can be enhanced by using the Feher Cycle as a topping cycle combined with turbine, steam turbine, and/or other heat process systems which can utilize the heat inputs and outputs of a Feher Cycle in an economic manner so the total system efficiency is always above that of the topping cycle and in some cases exceeds that of the Feher Cycle alone. At the same time, the initial cost of the compound systems per unit of converted heat energy can be reduced below that of any of the simple cycle systems incorporated.

One class of cycles with improved efficiency potential as well as the promise of being more economic in the first cost results from the combination of the Feher Cycle with a gas turbine. The Feher Cycle primary heat exchanger discharge is routed through the turbine of the gas turbine and the Feher Cycle primary is designed so as to exhaust at desired gas turbine inlet temperatures. As a result, the Feher Cycle engine "tops" the gas turbine cycle. Both the gas turbine and the Feher Cycle engine produce shaft power which can be used to produce electrical energy by driving electrical generators. The advantage of this Feher topping gas turbine system shows up as improved efficiency in the Feher Cycle primary heat exchanger as well as a major reduction in the size as a result of the pressurizing of the combustion gas stream by the gas turbine.

Other more sophisticated features can be added to the Feher topping gas turbine system such as including a regenerative gas turbine. In this cycle, the gas turbine exhaust gases are utilized to heat its compressor discharge prior to introduction to the combustor. This results in higher efficiencies and reduced exhaust gas temperature at the cost of adding a recuperator to the gas turbine. An afterburner can also be added between the Feher Cycle primary heat exchanger and the gas turbine inlet to provide additional heat energy. This enables the replacement of the gas turbines in a Feher topping gas turbine system to incorporate turbines of higher design inlet temperatures without modification to the Feher Cycle equipment. This results in an increased gas turbine total output as well as increases in efficiency as turbines which can cope with higher and higher turbine inlet temperatures are commercially available.

Other means of making effective use of the exhaust gas discharge of the Feher Cycle primary heat exchanger can be obtained by topping a steam turbine system with a Feher Cycle. In this system the Feher Cycle primary heat exchanger discharge is utilized to fire a waste heat, main steam boiler feeding a steam turbine generator which can be used to produce electrical energy in addition to the electrical energy produced by the Feher Cycle output turbine generator. In the Feher Cycle topping steam cycle the Feher Cycle secondary heat exchanger can be utilized in the steam system as a feed water heater to make effective use of a major heat loss from the Feher Cycle. The heat input to the steam system can be varied as desired by modification of the Feher Cycle recuperator to raise recuperator outlet temperatures. Like the Feher topping gas turbine cycle, the Feher Cycle topping steam turbine cycle can be modified by the use of additional components where such modifications are advantageous. For example, a supplementary combustor can be added to provide additional heat to the main boiler of the steam system. This arrangement permits a wide variation in steam turbine power while maintaining the output of the Feher Cycle constant. It also provides means for system matching when retrofitting the Feher Cycle in a topping arrangement to existing steam systems. It is also possible to use some or all of the steam generated to supply a process steam system. This latter arrangement is useful in industrial plants requiring electrical energy which is available from the Feher Cycle plus process steam. In addition to the above cycles, it is feasible and theoretically very efficient to build a tertiary system where the Feher Cycle tops a gas turbine which in turn tops a steam turbine wherein each of these systems may have the options mentioned above. In a tertiary system the Feher Cycle primary heat exchanger discharges into the turbine inlet of the gas turbine whose discharge in turn fires a waste heat boiler generating steam for the steam turbine cycle. The Feher Cycle secondary heat exchanger can then serve as a feed water heater to utilize the heat loss from the Feher Cycle effectively.

It is therefore a principle object of the present invention to more effectively utilize the high exhaust gas temperature characteristics of the Feher Cycle through a combination of the Feher Cycle with gas turbine systems, steam turbine systems, combination gas and steam turbine systems as well as process steam systems.

Another object is to provide means for operating a Feher Cycle system more effectively and more economically.

Another object of the present invention is to provide means for increasing efficiency of existing Rankine or Brayton Cycle systems by topping them with a Feher Cycle type device.

Another object is to provide a combined Feher Cycle, gas turbine, stream turbine system which can provide electricity, compressed gas, mechanical power, steam and heat energy to operate an integrated hydrocarbon conversion facility for the production of desirable hydrocarbon products such as gas and liquid fuel from coal.

These and other objects and advantages of the present invention will become apparent after considering the following detailed specification which covers preferred embodiments thereof in conjunction with the accompanying drawings wherein:

BRIEF DESCRIPTION OF THE DRAWINGS

FIG. 3 is a diagrammatic representation of a Feher Cycle topping afterburning, regenerated gas turbine machine;

FIG. 4 is a Temperature vs. Entropy diagram for the Feher Cycle of FIG. 3;

DESCRIPTION OF THE SHOWN EMBODIMENTS

Figure 1:
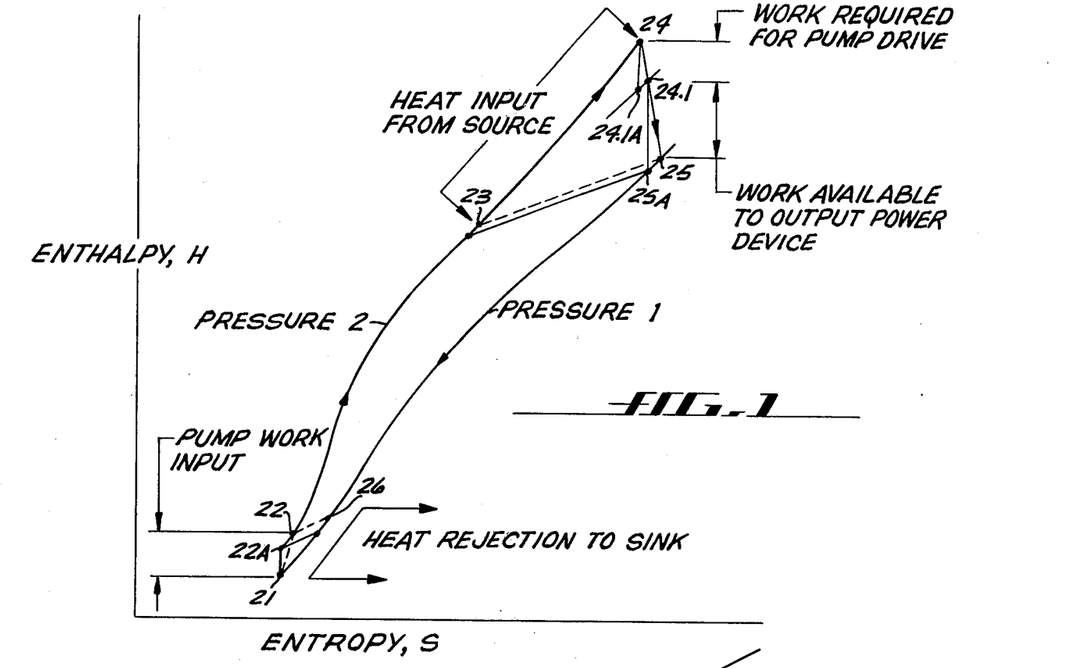
FIG. 1 is an Enthalpy vs. Entropy diagram for a typical Feher Cycle machine.

The ideal basic Feher Cycle consists of an isentropic pumping or compression process and an isentropic expansion process, joined by isobaric heating and cooling processes. These heating and cooling processes are limited by the Second Law of Thermodynamics, and require the addition of heat from an external source to complete the heating process and the rejection of heat to an external sink to complete the cooling process. The pumping and expansion processes are assumed to be isentropic since it is implicit in the mechanical concept of the cycle that these processes be performed by compact, highly loaded, efficient machines (typically turbodynamic) for which the isentropic process represents a commonly recognized standard of performance. The ideal basic cycle may then be completely described by six separate but interrelated processes which are individually described as follows, and illustrated in FIG. 1 which is the H-S domain of a typical supercritical pressure working fluid, with the important state points numbered from 21 to 26. Starting at state point 21 and going to point 22A, an isentropic pumping process is shown where the pressure of the working fluid is raised from Pressure 1 to Pressure 2. From point 22A to point 23, the working fluid is isobarically heated by the exchange of heat with the working fluid being cooled isobarically from point 25A to 26. The fluid is then isobarically heated by an external heat source from point 23 to 24. This raises the fluid to its highest temperature. Work is then extracted from the cycle by means of an isentropic expansion from points 24 to 25A which reduces the pressure of the fluid from Pressure 2 to Pressure 1. The work is used to provide both the pump work required for the pumping process from points 21 to 22A and the output work of the cycle. From state points 25A to 26 the fluid is isobarically cooled as aforesaid to heat the fluid from points 22A to 23 and then it is further isobarically cooled from point 26 to 21 to increase the density of the fluid and reduce the pump work required to pump the fluid from points 21 to 22A.

The thermodynamic performance estimation for the ideal basic cycle may be estimated as follows. The Thermal Efficiency may be defined as the quotient $$\frac{\text{Thermal Equivalent of Work Output Rate}}{\text{Thermal Input Rate}}$$

Work Output Rate $E_o = E_T - E_P$ where
$E_T$ = work output rate of expansion process
$E_P$ = work input rate of pumping process
$E_o$ = net work output rate of cycle hence $$\text{Thermal efficiency, } \eta th = \frac{E_o}{E_I}$$

where
$E_I$ = work equivalent of thermal input.

The specific work output rate $E_o/W$ is an important practical cycle parameter, since it directly indicates the relative the relative size of the equipment necessary to achieve a given system power output rate. The higher the value of $E_o/W$, the smaller the equipment need be for a specific purpose. W equals the working fluid flow rate in pounds/second.

To define the cycle performance parameters in terms of working fluid thermodynamic properties, $$E_T = W_{25}(H_{24} - H_{25A}) = W_{25} \cdot \Delta H_{TA}$$

$$E_P = W_{21}(H_{22A} - H_{21}) = W_{21} \cdot \Delta H_{PA} \qquad \text{A.}$$

$$E_I = W_{24}(H_{24} - H_{23}) = W \cdot \Delta H_{II}$$

In the ideal cycle there are no fluid leakages, therefore $$W_{25} = W_{21} = W_{24}$$

$$\eta th = \frac{\Delta H_{TA} - \Delta H_{PA}}{\Delta H_{II}} \qquad \text{B.}$$

Figures 1, 2:
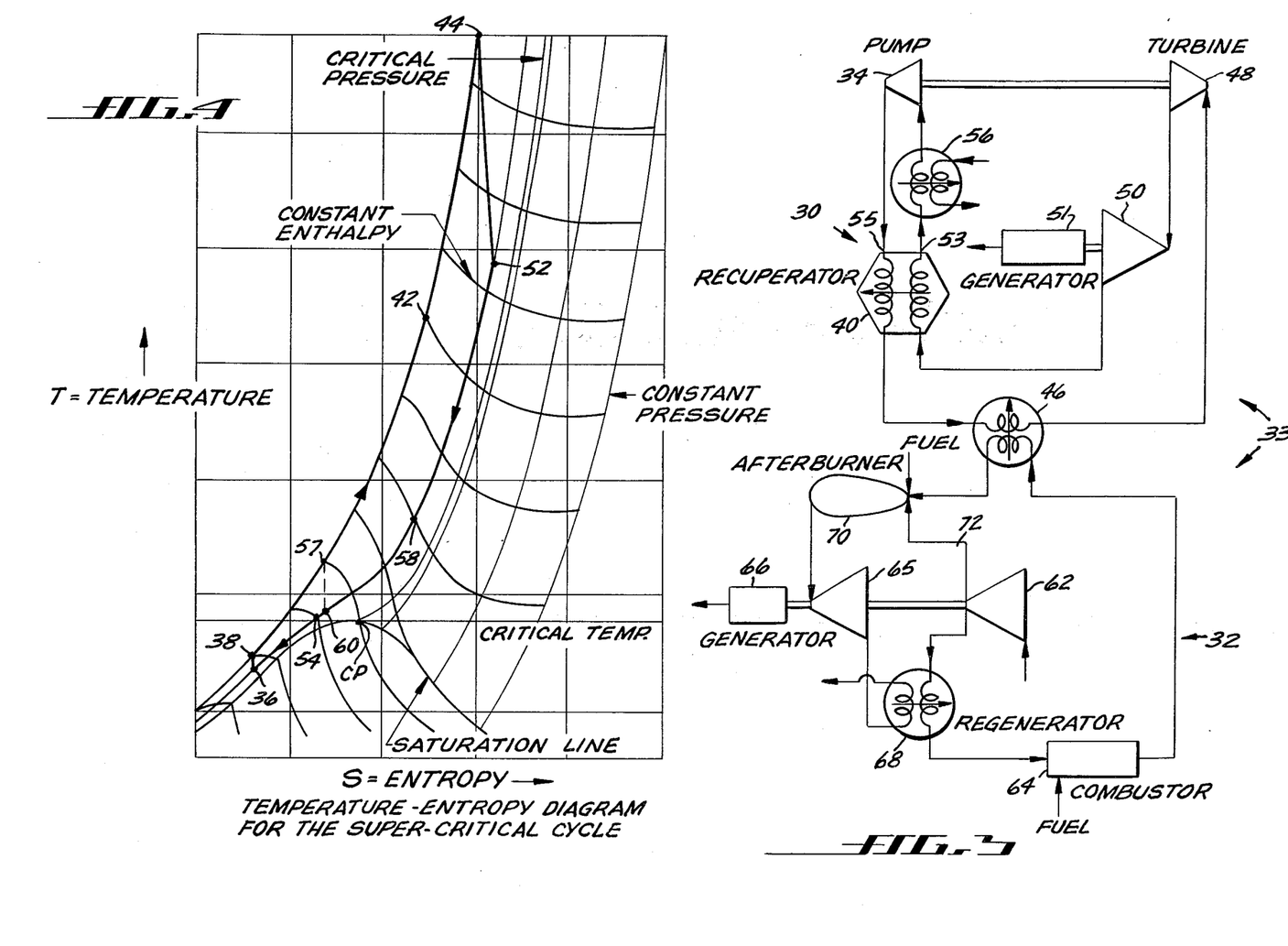
FIG. 2 is an Enthalpy vs. Temperature diagram for the conditions in a typical Feher Cycle recuperator.
Figure 2:
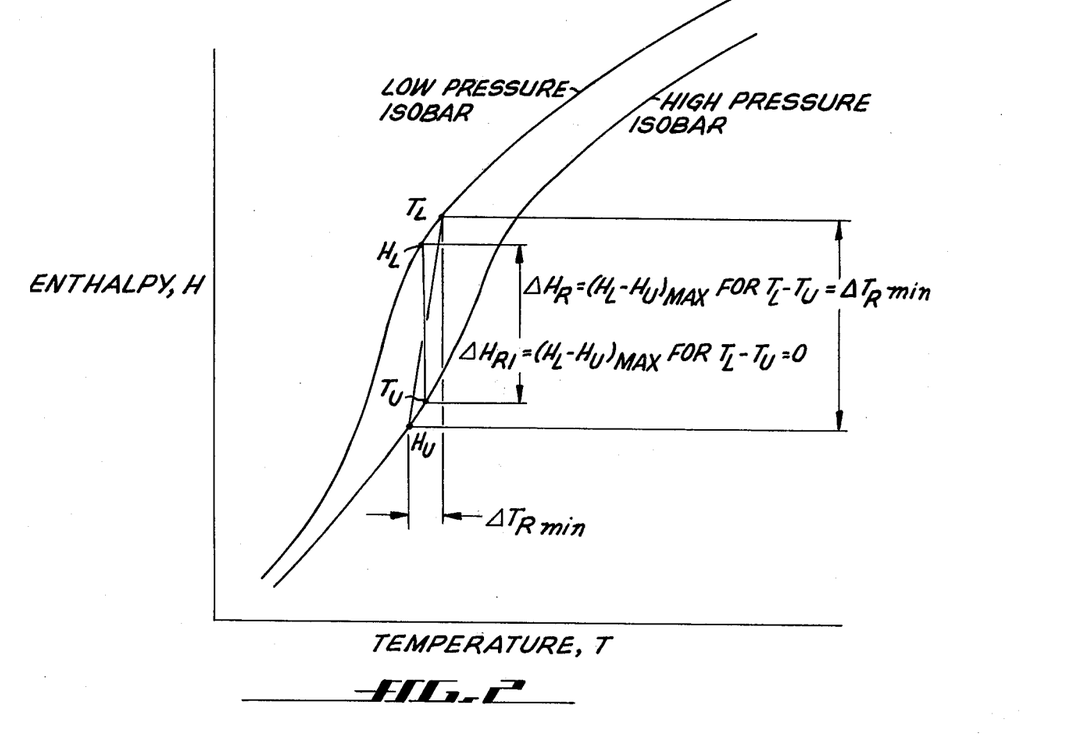

It may be seen from FIG. 2 that $\Delta H_H > \Delta H_{TA}$. The difference is caused by the real working fluid properties which produce a minimum enthalpy difference in the recuperative heat exchange process even though the process minimum temperature difference is reduced to zero in the ideal case. This difference is called the ideal pinch enthalpy difference in the recuperator ($\Delta H_{RI}$) and $\Delta H_H$ may be expressed as $$\Delta H_H = \Delta H_{TA} + \Delta H_{RI} \qquad \text{C.}$$

Substituting for $\Delta H_H$ in the previous equation, $$\eta_{th} = \frac{\Delta H_{TA} - \Delta H_{PA}}{\Delta H_{TA} + \Delta H_{RI}} = \frac{1 - \frac{\Delta H_{PA}}{\Delta H_{TA}}}{1 + \frac{\Delta H_{RI}}{\Delta H_{TA}}} \qquad \text{D.}$$

Also $$\frac{E_o}{W} = \frac{E_T}{W_{25}} - \frac{E_P}{W_{21}} = (\Delta H_{TA} - \Delta H_{PA}) \times \text{Constant}$$

This expression has the basic units of energy per unit mass, equivalent to power output per unit of flow rate. For a given cycle power output rate $E_o$, the required cycle fluid flow rate is given by $$W = \frac{E_o}{\Delta H_{TA} - H_{PA}} \times \text{Constant} \qquad \text{E.}$$

It is evident that these basic cycle parameters depend only upon the working fluid enthalpy properties and that the definition of these properties in terms of temperature and pressure is essential to correct estimation of cycle performance.

Of course, the real cycle must be a modification of the ideal cycle. The modification is required in order to engineer the system to meet the needs of a specific application, and to allow for the actual component efficiencies which can be achieved, the parasitic losses such as friction pressure losses due to fluid flow, and the bearing leakage flow and temperature difference losses which accrue from the reduction of the cycle to practical machinery. An engine system also has additional losses due to the power requirements of subsystems and external thermal losses.

The performance estimation for a real cycle follows identically the same procedure used for the ideal cycle. Hence, $$\eta_{th} = \frac{E_o}{E_I} = \frac{W_{25} \cdot \Delta H_T - W_{21} \cdot \Delta H_P - E_L}{W_{24} \cdot (\Delta H_T + \Delta H_R) + QL} \qquad \text{F.}$$

However, $W_{25}$ and $W_{21}$ are not necessarily equal due to leakage flows, and $$\Delta H_T = \Delta H_{TA} \cdot \eta_T$$
$$\Delta H_P = \frac{\Delta H_{PA}}{\eta_P} \qquad \text{G.}$$

where $$\frac{\Delta H_{RI}}{\Delta H_R} = \eta_R \qquad \text{H.}$$

$E_L$ = mechanical losses
$QL$ = external thermal losses and $\eta_T$, $\eta_P$, and $\eta_R$ are the efficiencies of the turbine, pump and recuperator systems respectively. In the real cycle, the values of $\Delta H_{TA}$ and $\Delta H_{PA}$ are evaluated considering the pressure losses which occur in the cycle. Since pressures $P_{22} > P_{24}$ and $P_{25} > P_{21}$ it follows that $P_{22}/P_{21} > P_{24}/P_{25}$.

The values of efficiency which are ascribed to the turbine and pump systems can be obtained from empirically derived curves which describe the efficiency as a function of the specific speed of the turbomachine. The specific speed NS is defined as $$NS = \frac{N \sqrt{V}}{(\Delta H_A)^{3/4}} \qquad \text{I.}$$

and is the most powerful of the several parameters which influence the performance of turbomachines.

The efficiency of the recuperator can be defined as $$\eta_R = \frac{\Delta H_{RI}}{\Delta H_R} \qquad \text{J.}$$

where the definition of $\Delta H_{RI}$ and $\Delta H_R$ can be readily interpreted from FIG. 2. In a practical heat exchanger $\Delta T_R > 0$.

The specific output of the cycle is therefore $$\frac{E_o}{W} = \frac{W_{25} \cdot \Delta H_T - W_{21} \cdot \Delta H_P - E_L}{W_{21}} \qquad \text{K.}$$

These above equations form the basis of all basic supercritical cycle and engine system performance estimates which follow.

As with other power conversion cycles, the basic Feher Cycle processes may be modified in order to achieve system performance or operational characteristics that have specific advantages for specific applications. For example, the pumping process may be divided into two or more stages with intercooling between stages to reduce the required cycle pumping work. In a similar fashion, the power producing expansion process may be divided into two or more stages with reheating between stages to increase the turbine gross work output. In the supercritical cycle, the pump work is characteristically small unless the application demands a high pump inlet temperature such as when warm ambient air is used as the cold sink. In most cases, it can be shown that pump intercooling improves the cycle performance by a relatively small amount and turbine interstage reheating is a more productive modification, although the characteristically small turbine overall pressure ratio restrains the performance improvements to quite modest proportions.

A review of the basic Feher Cycle efficiency computation reveals that the largest portion of the heat that is rejected from the cycle is attributable to the inability of the recuperator to recover more thermal energy from the turbine exhaust stream. Even if a minimum temperature difference of zero is assumed, the unrecoverable energy is of the same order as the turbine work for a typical cycle. It is evident that cycle modifications capable of reducing this unrecoverable energy significantly can result in a large improvement in Feher Cycle thermal efficiency.

In addition to modifications of the basic Feher Cycle, it is possible to improve its practicality by utilizing the basic characteristics thereof in combination with other types of turbomachinery so that the Feher Cycle tops the other machinery. For example, in FIG. 3 a $CO_2$ Feher Cycle machine 30 is shown topping an afterburning, regenerated gas turbine 32 to form a Feher Cycle topping gas turbine machine 33. The temperature versus entropy diagram for the Feher Cycle machine 30 is shown in FIG. 4. When the low temperature point of the Feher Cycle is below the critical temperature of the working fluid, then the cycle corresponds to the Feher Cycle machine patent referenced above. The machine 30 includes a pump 34 which takes the $CO_2$ working fluid at point 36 which is the lowest temperature in the cycle and compresses it isentropically to a higher pressure and temperature. This process is shown in FIG. 4 by the line from point 36 to point 38. The fluid is thereafter heated isobarically in a recuperator 40 until it reaches point 42, the arrow showing the direction of heat flow. Heat energy from an external source then is added to the working fluid to raise its temperature to that shown at point 44. The heat is added by means of a primary heat exchanger 46 whose heat is obtained by adding fuel to the compressor discharge of the gas turbine 32. The working fluid is then isentropically expanded through a pump turbine 48 and a power output turbine 50 until its pressure is back down to the pump inlet pressure and the temperature indicated by point 52. The separate pump turbine 48 is used to drive the pump 34 since such pumps characteristically run at high rotational speeds which are not compatible with the desired power turbine speed which usually supplies shaft power to a generator 51. When at point 52 the $CO_2$ working fluid is relatively hot so the heat therein is transferred to the higher pressure working fluid in the recuperator 40. It is preferable that the recuperator 40 be of the counter flow type allowing the $CO_2$ at the low pressure outlet 53 to be cooled to a temperature indicated by point 54 which is almost as cold as fluid at the high pressure inlet 55 of the recuperator 40. At this point additional energy must be removed by a secondary heat exchanger 56 to process the working fluid down to the desired pump inlet temperature as indicated by point 36.

The cycle just described assumes that the secondary heat exchanger 56 can lower the temperature of the working fluid sufficiently below the critical temperature to allow the pump 34 to inlet and exhaust below the critical temperature where the required pump work is minimal. This is usually the case when a water coolant source is available. However, the critical temperature of $CO_2$ is 87.7°F and many locations on the earth, not close to a water coolant source, have an ambient air temperature exceeding 87°F at least certain times of the year. Therefore, an ambient air cooled Feher Cycle may have a pump 34 designed for an inlet temperature above the critical temperature. When such is the case, the machine 30 is less efficient although such a cycle will work. The reduction is efficiency resulting from raising the heat sink temperature due to ambient air cooling is normally 4 to 8% depending on the ambient air temperature. This can be economically traded for less electrical transmission line loss, lower fuel cost, the ability to provide rated power the year around, or other advantage. When the cycle pump inlet temperature is raised, the recuperator 40 has a higher temperature (point 57), high pressure fluid present at its input 55 so that its low pressure output 53 will also be at a higher temperature such as indicated by point 58. Therefore, the input to the secondary heat exchanger 56 is at a relatively higher temperature shown by point 58 allowing the ambient air coolant of secondary heat exchanger to cool the working fluid down to the temperature at point 60. It can be seen in FIG. 1 that as the entropy of the working fluid increases, the work (enthalpy) required to elevate the pressure of the working fluid also increases because of the divergence of the pressure isobars. This is a prime reason for the lower efficiency of an air cooled or increased pump inlet temperature Feher Cycle compared to one where a cold sink of a suitable low temperature is available.

Whether the pump inlet temperature of Feher Cycle 30 is as cold as desired or not, the primary heat exchanger 46 must have a relatively high minimum combustion gas primary exhaust temperature since the working fluid exiting therefrom must have a temperature above the desired inlet temperature of the pump turbine 48. It is also desirable to have both the $CO_2$ and combustion gas sides of the primary heat exchanger 46 pressurized so that smaller components can be used to reduce its size and its first cast, and there is less in the way of differential pressures across the elements therein.

In FIG. 3 the problems of the primary heat exchanger 46 are lessened by using the Feher Cycle 30 as a topping cycle on the gas turbine 32. In the gas turbine 32, air is supplied to a compressor 62 which compresses the air and passes it to a combustor 64 where it is mixed with fuel and burned to form the hot combustion gases at the relatively high pressures needed for the primary heat exchanger 46 of the Feher Cycle 30. Once the exhaust gases of the gas turbine 32 have been passed through the primary heat exchanger 46 and cooled somewhat, they are passed through a power turbine 65 which extracts work therefrom to drive the compressor 62 and provide shaft power to an electric generator or other such energy conversion device 66. As shown in FIG. 3 the combustion gases exiting the turbine 65 would be slightly above atmospheric pressure but would still contain substantial amounts of heat. This heat can be utilized by passing the exhaust gases through a regenerator 68 to heat the air that has been compressed by the compressor 62 before it is fed to the combustor 64. Such regenerators 68 increase the overall efficiency of the total system 33.

For maximum efficiency it is desired that the Feher Cycle 30 run at its rated power output continuously. Therefore, it is convenient to have means in the gas turbine 32 with which to control the total power output of the combined machine 33 while assuring that the desired heat is supplied to the primary heat exchanger 46. Such means can include an afterburner 70 placed in the combustion gas stream between the primary heat exchanger 46 and the power turbine 65. An auxillary air line 72 can be provided to conduct pressurized air from the compressor 62 directly to the afterburner 70 so that excess air does not have to be heated for passage through the primary heat exchanger 46 that is to provide non-vitiated air to be combusted in the afterburner. The additional air is mixed with fuel and burned to supply additional heat energy for driving the turbine 65 and thus producing the capacity for additional output from the generator 66.

Figure 5:
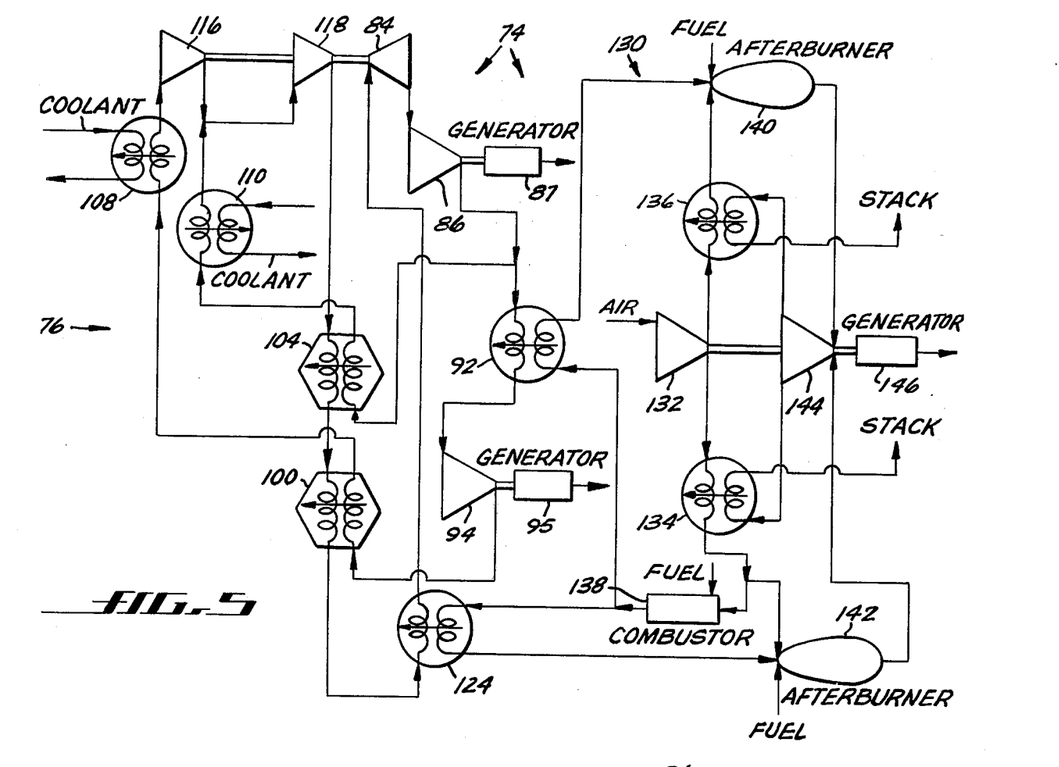
FIG. 5 is a diagrammatic representation of a split, low pressure flow Feher Cycle topping afterburning, regenerated gas turbine machine.
Figure 6:
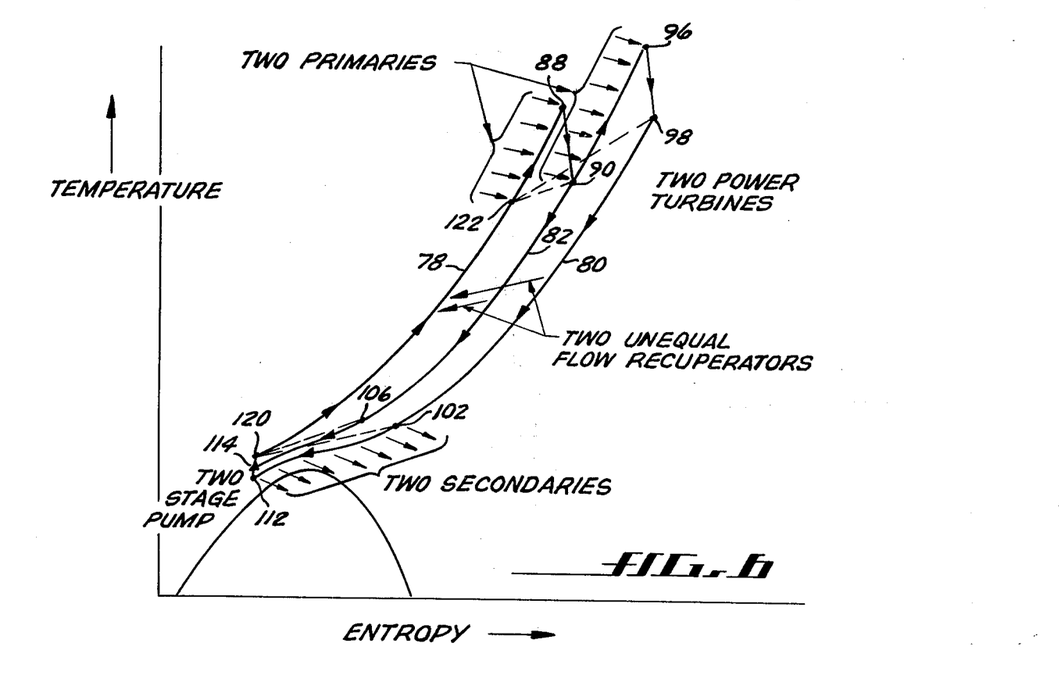
FIG. 6 is a Temperature vs. Entropy diagram for the Feher Cycle of FIG. 5.

A similar Feher Cycle topping gas turbine machine 74 is shown in FIG. 5 wherein the Feher Cycle is of the split low pressure flow type. The temperature versus entropy diagram for the Feher Cycle is shown in FIG. 6. The split flow Feher Cycle 76 is essentially two superimposed supercritical cycles having identical upper pressure levels 78 but different low pressure levels 80 and 82.

The full cycle flow is expanded through a pump driving turbine 84 and a first power turbine 86 which provides shaft power to drive an electrical generator 87. This expansion is shown between points 88 and 90 on FIG. 6. A portion of the flow is then reheated in a primary heat exchanger 92 before a good expansion in a second power turbine 94 which may drive generator 87 or the separate generator 95 shown. The reheating is shown between points 90 and 96 while the second expansion is shown between points 96 and 98 of FIG. 6. The working fluid then flows to an unequal flow recuperator 100 where it is cooled from the temperature at point 98 to the temperature at point 102. The portion of the flow which did not pass through the primary heat exchanger 92 is also fed to an unequal flow recuperator 104 which cools the working fluid flowing therethrough from the temperature at point 90 to the temperature at point 106. The total high pressure flow passes through the high pressure sides of the two recuperators 100 and 104 which are in series. Therefore, the high pressure flow is equal to the total flow on the low pressure sides of the recuperators 100 and 104 but the flow ratio within each recuperator is unbalanced. The recuperator 100 which has the lowest pressure flow will have an unbalance such that the high pressure flow rate is greater than the low pressure flow rate. In this manner it is possible to obtain a significant increase in recuperator thermal efficiency and hence, an improved thermal cycle.

Once the working fluid has left the low pressure sides of the recuperators 100 and 104 it is fed respectively to secondary heat exchangers 108 and 110 where it is cooled to the temperatures indicated at points 112 and 114 respectively. The fluid flowing out of the secondary heat exchanger 108 is compressed by a pump 116 until its pressure is equal to that of the working fluid exiting the other secondary heat exchanger 110. From there the total flow is further compressed by pump 118. Both pumps 116 and 118 are shown being driven by the pump turbine 84, however, two pump turbines can be used if it is desired to run the pumps at different speeds. The net result of the two pumps 116 and 118 is to raise the pressure of the working fluid up to pressure 78 for passage through the two recuperators 104 and 100 where its temperature is raised from that at point 120 to point 122. The full cycle flow is then heated from point 122 to 88 in another primary heat exchanger 124 whose outlet is connected to the inlet of the pump turbine 84 discussed above.

The split low pressure flow cycle has a significant increase in recuperator thermal recovery and hence and improved thermal efficiency over that of the basic Feher Cycle. However it does have the disadvantage that the specific power output per unit of working fluid is inferior to that of the basic cycle operating between the same maximum and minimum pressures and temperatures.

The heat for the primary heat exchangers 92 and 124 in the machine 74 is provided by a gas turbine machine 130 which is similar to but more complex than the gas turbine machine 32 of FIG. 3. In the machine 130, ambient air is compressed by a compressor 132 and fed through regenerators 134 and 136 so that the heat content and temperature thereof is raised. The heated air output of the regenerator 134 is then fed to a combustor 138 where it is mixed with fuel and burned. The exhaust products from the combustor 138 are fed to the primary heat exchangers 92 and 124 where a portion of the heat content thereof is transferred into the Feher Cycle machine 76. The cooled but still hot exhaust products exiting from the primary heat exchangers 92 and 124 can then be fed to afterburners 140 and 142, respectively. Two afterburners are needed because of the different flow rates and temperatures of the combustion gases exiting the primary heat exchangers 92 and 124. The hot exhaust products fed to the afterburner 140 are mixed with the heated air output of the regenerator 136 and fuel and further burned to raise the temperature and heat content thereof. The output of the primary heat exchanger 124 is also mixed with heated air from the regenerator 134 and fuel and then burned in the afterburner 142. The now reheated exhaust products from the afterburners 140 and 142 are then fed to a power turbine 144 which drives the compressor 132 and produces shaft power to drive means such as the generator 146 to produce electrical energy. The afterburners 140 and 142 are also used as control devices so that the Feher Cycle machine 76 can be operated at its optimum flow rate and yet the total machine 74 can produce a variable amount of electrical energy by varying the output of the generator 146. The expanded gases having passed through the turbine 144 are transmitted to the regenerators 134 and 136 where their heat content is transferred in part to the incoming compressed air to further cool the exhaust products before they are released into the atmosphere.

Figures 7, 8:
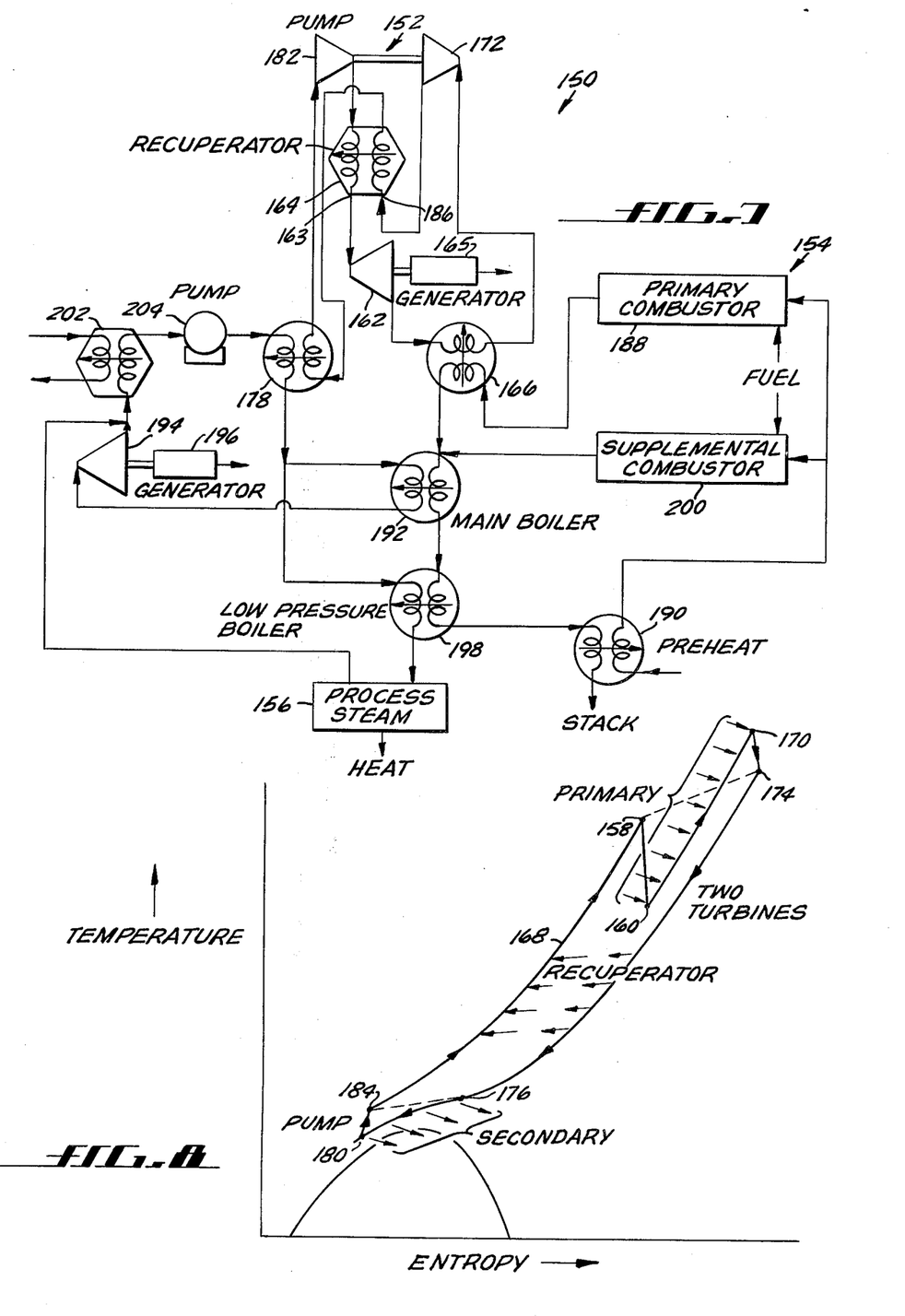
FIG. 7 is a diagrammatic representation of a post heat Feher Cycle topping supplementary fired steam turbine machine including process steam.
FIG. 8 is a Temperature vs. Entropy diagram for the Feher Cycle of FIG. 7.

The machines of FIGS. 3 and 5 show that gas turbine technology can be combined with Feher Cycle technology to result in a combined machine which has advantages that neither has alone. As will be shown hereinafter, in certain instances it is also advantageous to combine a Feher Cycle machine with a steam turbine machine. This is shown in FIG. 7 where the machine 150 includes a post heat Feher Cycle 152 and a supplementary fired steam turbine machine 154 which includes a process steam output 156. The post heat machine 152 like the split flow machine 76 is a modification of the basic Feher Cycle. The temperature versus entropy diagram for the machine 152 is shown in FIG. 8. The primary power expansion (between points 158 and 160) in the turbine 162 takes place immediately after the high pressure working fluid leaves the hot high pressure end 163 of the recuperator 164 where the working fluid is at point 158. The turbine 162 is the power output for the cycle and provides shaft power for driving means like generator 165. From the power turbine 162 the working fluid is conducted to the primary heat exchanger 166, at the greatly reduced pressure as shown by point 160 which is well below the maximum cycle pressure shown by the isobar 168. The primary heat exchanger 166 raises the temperature of the working fluid up to that shown by point 170. The heated working fluid is then transmitted to the pump turbine 172 which expands it down to pressure and temperature indicated at point 174. The fluid is then fed to the low pressure side of the recuperator 164 for the transferring of heat to the high pressure side, the fluid exiting the low pressure side is cooled to point 176. THe fluid is then further cooled by a secondary heat exchanger 178 which cools it to point 180 at which point the fluid is at relatively low temperatures but high density. A pump 182 driven by the pump turbine 172 is then used to compress the fluid up to the pressure indicated by the isobar 168 and the temperature indicated by point 184 wherein it is again passed to the high pressure side of the recuperator 164 for continuation of the cycle. It should be noted that second expansion takes place between points 170 and 174 after the heating process in the primary heat exchanger 166 but it is of relatively small proportions. Therefore, the low pressure flow in the recuperator 164 which is cooled from point 174 to point 176 is hotter at the low pressure inlet 186 thereof than would be the case if the unmodified cycle of FIG. 3 were used with a given cycle maximum temperature. However, the relatively low pressure level alleviates the tube material strength requirements considerably for the primary heat exchanger 166 and is advantageous in some instances. The thermal efficiency and the specific power output characteristics of the machine 152 are poorer than those of the equivalent basic cycle of FIG. 3 due to the lower temperature level at which the main expansion in the power turbine 162 takes place. However, given the right set of circumstances the advantages of ease of construction of the primary heat exchange 166 can make the overall system more advantageous.

As aforesaid the Feher Cycle machine 152 tops a steam turbine machine 154. The 150 includes a primary combustor 188 which is fed preheated air from an air preheater 190 and fuel which are burned therein. The exhaust products of the primary combustor 188 are the heat source for the primary heat exchanger 166 of the Feher Cycle machine 152. Once the exhaust products have passed through the primary heat exchanger 166 where they are cooled, they still have a high temperature due to the character of the Feher Cycle primary heat exchanger 166 as discussed above. They are therefore fed to a main boiler 192 where they are used to generate the steam for driving a steam turbine 194 and its associated mechanical energy conversion means generator 196. Since it is desired to feed high quality steam to the turbine 194, the exhaust gases out of the main boiler 192 still contain considerable heat and can be used to fire a low pressure boiler such as the boiler 198 shown. The optional low pressure boiler 198 can be used to generate processed steam for the processed steam unit 156. Whether or not a low pressure boiler 198 is used, the exhaust products can then be passed through the optional air preheater 190 before they are finally released up the stack. It should be realized that both the preheater 190 and the low pressure boiler 198 are optional features included to more effectively use the heat content of the combustion gases. Since the heat content of the combustion gases may be less than that desired after passing through the primary heat exchanger 166, a supplementary combustor 200 can be provided to burn fuel and the preheated air for supply directly to the main boiler 192. The supplementary combustor 200 enables a measure of control to the complete machine 150 since the Feher Cycle machine 152 then can always be operated at its maximum efficiency while the supplementary combustor 200 generates additional heat to increase the power output of the steam turbine machine 194 when desired. The spent steam and the power turbine 194 and, perhaps, some portion of the process steam is then passed through a condenser 202 to cool, and liquify the steam into water. The pressure of the cool water is thereafter raised by a pump 204 which pumps it through the Feher Cycle secondary heat exchanger 178 which utilizes the water to cool the $CO_2$ in the Feher Cycle machine 152 while heating the water in the steam turbine machine 154 and therefore acting as a feed water heater. The feed water is fed to the main boiler 192 and the optional low pressure boiler 198 for conversion into steam.

Figure 9:
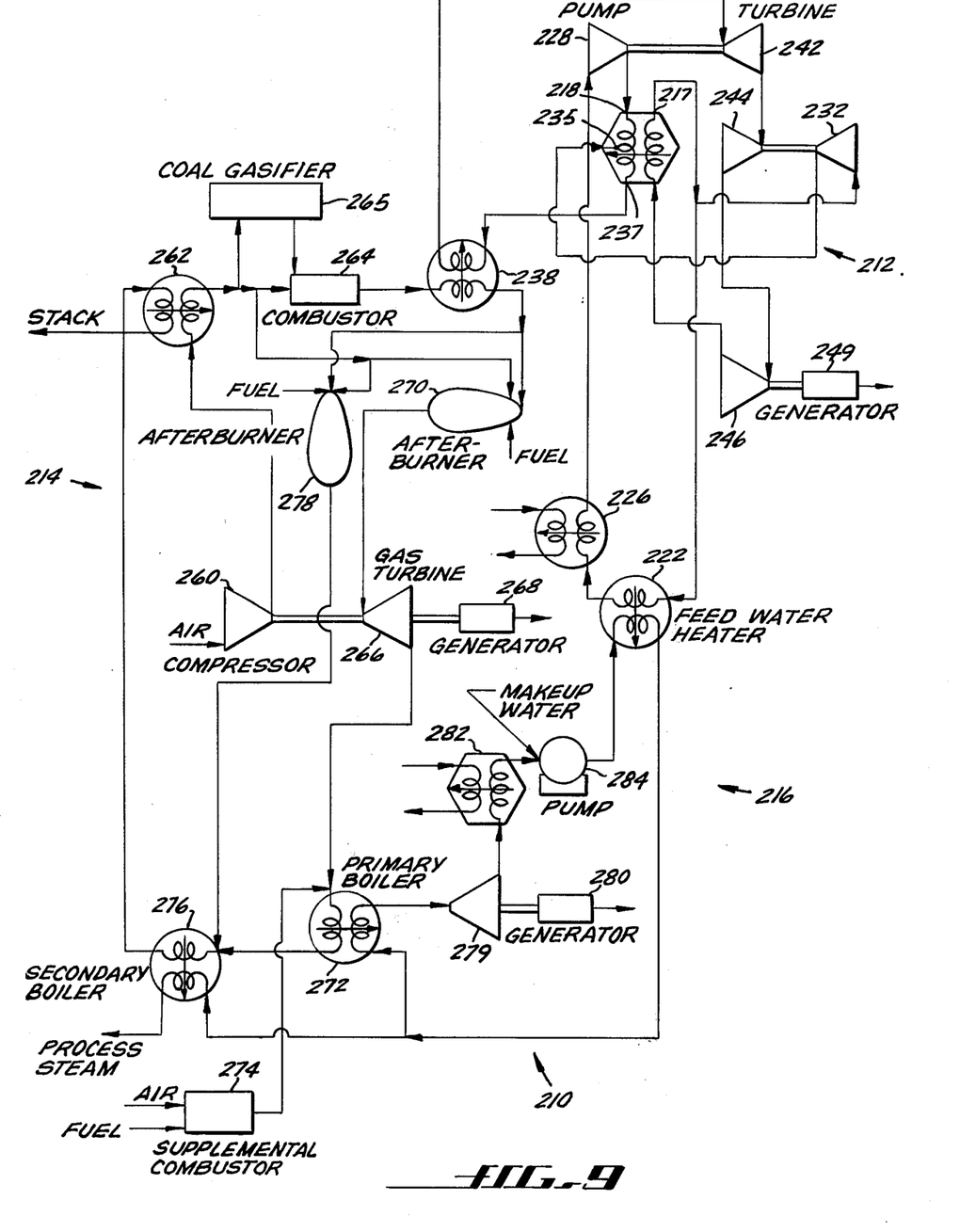
FIG. 9 is a diagrammatic representation of a recompression Feher Cycle topping afterburning, regenerated gas turbine topping supplementary fired steam turbine machine including process steam and a coal gasifier.
Figure 10:
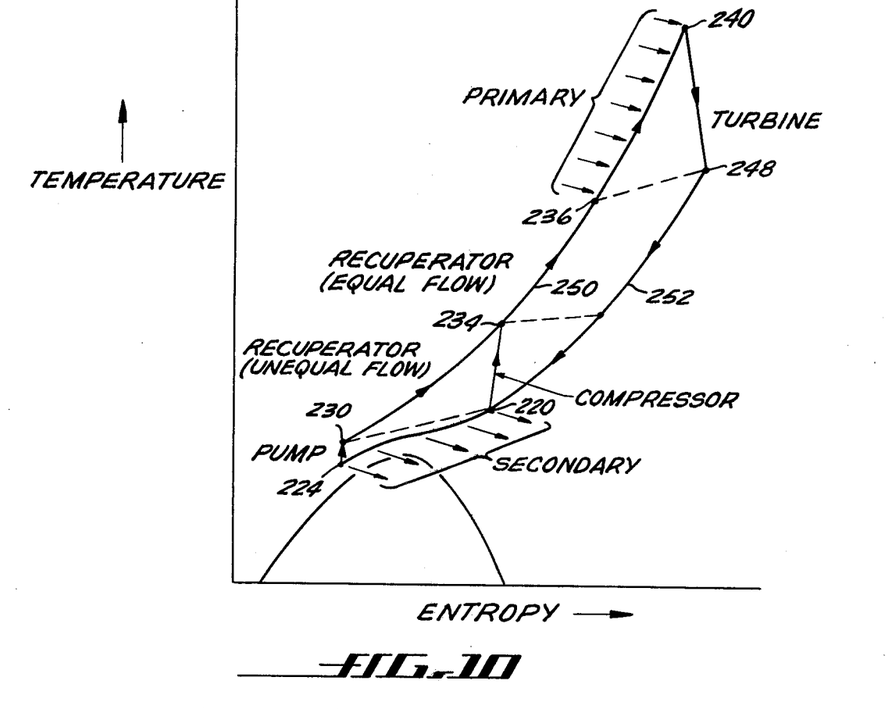
FIG. 10 is a Temperature vs. Entropy diagram for the Feher Cycle of FIG. 9.

The previous binary systems of FIGS. 3, 5 and 7 show that the Feher Cycle with its various modifications are advantageous in the topping of a gas turbine or steam turbine cycle. FIG. 9 discloses a tertiary thermodynamic machine 210 which includes a recompression Feher Cycle machine 212, an afterburning recuperated gas turbine 214, and a supplementary fired steam turbine machine 216. The temperature versus entropy diagram for the recompression Feher Cycle machine 212 is shown in FIG. 10.

The name "recompression" implies that a part of the working fluid that leaves the low pressure exit 217 of the Feher Cycle recuperator 218 is directly recompressed to join the high pressure working fluid stream partway through the recuperator 218. The thermodynamic condition of the working fluid that does leave the low pressure side of the recuperator 218 is indicated by point 220 in FIG. 10. As shown, a portion of the fluid is passed to a secondary heat exchanger 222 so that its temperature is reduced to that indicated by point 224. Since the secondary heat exchanger 222 is in fact used as a feed water heater for the steam turbine machine 216, it is possible that the working fluid in the Feher Cycle machine 212 is not sufficiently cooled in the secondary heat exchanger 222 so an optional secondary heat exchanger 226 can be provided downstream of exchanger 222 to assure that the working fluid reaches the condition of point 224. The working fluid is then compressed by a pump 228 to the temperature and pressure indicated by point 230 before being passed to the high pressure side of the recuperator 218 for reheating. The portion of the fluid leaving the low pressure side of the heat exchanger 218 which was not passed to the secondary heat exchanger 222 is fed to a compressor 232 which raises its pressure and temperature from point 220 to point 234. This working fluid is then combined at a junction 235 in the high pressure side of the recuperator 218 with the partially heated fluid from the pump 228 which has been heated to the temperature indicated by point 234. The combined flow of the high pressure side exit 237 of the recuperator 218, heated to the temperature indicated by point 236, is conducted to the primary heat exchanger 238 where its temperature is raised to that indicated at point 240 by the introduction of more heat from the combustion gases of the gas turbine machine 214. The heated high pressure working fluid is thereafter expanded in a turbine 242 which drives the pump 228 and a turbine 244 which drives the compressor 232 before being passed to the power output turbine 246 where the working fluid is reduced in pressure and is at the temperature indicated by point 248 in FIG. 10. The turbine 246 provides the work output for the cycle and is shown driving an electrical generator 249. The working fluid is then conducted back to the low pressure inlet of the recuperator 218 where as much as possible of its heat energy is transferred to the working fluid in the high pressure side thereof. The recompression Feher Cycle unbalances the flow rate ratio in the lower temperature portion of the recuperator 218 which is upstream from the junction 235 and therefore increases the recovery of thermal energy from the exhaust stream of the power turbine 246. The compression process requires more work per unit flow rate than the pumping process and therefore the specific power output of the machine 212 is lower than that of the basic Feher Cycle machine as shown in FIG. 3. However, the recompression flow fraction (amount recompressed versus total flow) can be selected such that the additional cycle compression work is less than the improvement in the thermal recovery of the recuperator 218 and a high cycle efficiency is obtained. Although the minimum temperature difference between the high pressure stream, as indicated by isobar 250, and the low pressure stream, indicated by isobar 252, is the same, the temperature difference profile is altered therefore the cost of the increased efficiency of the machine shows up as an increase in the surface area and cost of the recuperator 218 because of the very flat temperature difference profile in the unequal flow portion of the recuperator 218.

As in the previous Feher Cycle topping gas turbine machines, the gas turbine 214 supplies the heat energy for the primary heat exchanger 238 of the Feher Cycle machine 212. As shown the gas turbine machine 214 includes a compressor 260 which compresses ambient air which thereafter may be heated by a regenerator 262 for passage to a combustor 264. Since the air is compressed and heated it is convenient to use it both for combustion and to pressurize fuel generation means such as the coal gasifier 265 shown. Whether a coal gasifier or other similar device 265 is used, the fuel and air are supplied to the combustor 264 where they are burned, supplying the heat energy for the primary heat exchanger 238 of the Feher Cycle 212. Thereafter the exhaust products are supplied to a power turbine 266 which is used to drive the compressor 260 and, if sufficient energy is available, a generator 268. To assure that sufficient energy is available on demand an afterburner 270 can be included between the primary heat exchanger 238 and the power turbine 236, such afterburner 270 being supplied with heated air from the regenerator 262 and perhaps fuel from the coal gasifier 265 by means of a line not shown. The afterburner 270, as afterburners in the previous example, is used to control the process so that the desired amount of electrical energy can be obtained from the generator 268. The expanded and cooled exhaust products leaving the power turbine 266 are then conducted to the primary boiler 272 of the steam turbine machine 216. The exhaust gases of the gas turbine machine 214 therefore are also the primary heat source for the steam turbine machine 216. To enable control of the steam turbine machine 216 it may be desirable to supply additional heat energy to the primary boiler 272 and this can be done by means of a supplementary combustor 274. The supplementary combustor 274 will necessarily be less efficient than the combustor 264 in terms of size and the material involved in the manufacture thereof since it must operate at the discharge pressure of the gas turbine 266 which is normally just above ambient pressure. The exhaust products from the primary boiler 272 being relatively hot can be used to fire a secondary boiler 276 for the manufacture of process steam, if process steam is desired for some reason such as use in the coal gasifier 265 if the coal gasification process so requires. For control of the process steam it may also be desired to provide an additional afterburner 278 which receives exhaust products downstream of the primary heat exchanger 238 along with compressed and heated air from the recuperator 262 and perhaps compressed gaseous fuel from the coal gasifier 264 to provide additional heat energy to the secondary boiler 276. The exhaust of the secondary boiler 276 can then be used to provide the heat energy for the regenerator 262 before being exhausted out the stack.

As aforesaid, the steam for the steam turbine machine 216 is generated in the primary boiler 272. It is then passed to a power turbine 279 where it is expanded and cooled by the work extracted therefrom to operate a connected generator 280. The spent steam is then cooled to liquid form in the condenser 282 and then recompressed by the pump 284 and transferred to the secondary heat exchanger 222 of the Feher Cycle machine 212 which, as aforesaid, acts as a feed water heater for the steam cycle 216. The heated water is thereafter conducted to the primary boiler 272 for conversion into high quality steam and the secondary boiler 276 for conversion into steam required for the process steam requirements. Of course if the process steam is open ended as shown, make-up water must be injected into the system and this is done at the inlet to the pump 284 as shown. In FIG. 9 as well as in FIGS. 3, 5 and 7, the extensive use of counterflow heat exchangers and recuperators should be noted since most of the cycles require a maximum temperature change of the transmitted fluid rather than a high efficiency for a given amount of surface area therein.

Therefore that has been shown and described novel thermodynamic cycles having supercritical $CO_2$ cycle topping which fulfill all of the objects and advantages sought therefor. Many changes, alterations, other uses and applications of the subject thermodynamic cycles will become apparent to those skilled in the art after considering this specification and the accompanying drawings. All such changes, modifications, variations and other uses and applications which do not depart from the spirit and scope of this invention are deemed to be covered by the invention which is limited only by the claims which follow.

What is claimed is:
1. A heat engine comprising:
a circulating system containing $CO_2$ above its critical pressure, a $CO_2$ pump having an inlet and an outlet, said $CO_2$ pump raising the pressure of the $CO_2$ from a first supercritical pressure to a second supercritical pressure, a primary heat exchanger having a $CO_2$ inlet and outlet, said primary heat exchanger heating the $CO_2$ when it is at a pressure above said first supercritical pressure, a secondary heat exchanger having a $CO_2$ inlet and outlet, said secondary heat exchanger cooling the $CO_2$ when it is at said first supercritical pressure, a recuperator having high and low pressure sides, said recuperator being for transferring heat from the $CO_2$ at the first pressure to $CO_2$ at a higher supercritical pressure, and a turbine having an inlet and an outlet, said turbine expanding the $CO_2$ extracting work therefrom and exhausting at said first supercritical pressure; and a gas turbine system having a compressor for increasing the pressure of air fed thereto, a combustor having an input to receive the compressed air from the compressor and an input to receive fuel, the compressed air and fuel being burned in said combustor to form hot combustion products, means for placing said hot combustion products in heat transfer relationship with the $CO_2$ in said primary heat exchanger to heat the $CO_2$, and a turbine connected to receive the combustion products from said primary heat exchanger, said turbine expanding and cooling said combustion products to extract work therefrom to drive said compressor, said $CO_2$ turbine being connected at its high pressure side to said primary heat exchanger and on its low pressure side to said recuperator, said recuperator being connected to pass a portion of the low pressure $CO_2$ to said secondary heat exchanger, said secondary heat exchanger cooling the $CO_2$ and conducting it to said $CO_2$ pump which pressurizes said $CO_2$ and conducts it to the high pressure side of said recuperator, said system including a $CO_2$ compressor connected to receive a portion of the low pressure $CO_2$ from said recuperator and to pressurize it; said recuperator high pressure side including a junction for receipt of the $CO_2$ pressurized by said $CO_2$ compressor, the heat engine further including:

a primary boiler connected to receive the combustion products from said turbine, said primary boiler transferring heat from the combustion products to pressurized water to generate steam therefrom;

a steam turbine connected to receive the steam from said primary boiler and to expand it to extract work therefrom;

a condenser connected to receive the steam once the work has been extracted therefrom, said condenser converting the work extracted steam to water;

a water pump connected to said condenser to pressurize the water therefrom;

feed water heater means connected to said water pump and being in heat transfer relationship to said secondary heat exchanger which extracts heat from the $CO_2$ by heating the pressurized water; and means for conducting the pressurized water from said feed water heater means to said primary boiler for heating into steam.

2. The heat engine defined in claim 1 including:

a supplementary combustor for burning fuel and air supplied thereto, said supplementary combustor being connected to supply the combustion products thereof to said primary boiler to supply additional heat thereto;

a secondary boiler connected to receive the combustion products from said primary boiler and pressurized water from said feed water heater means, said secondary boiler transferring heat from the combustion products to the pressurized water to generate steam therefrom; and a regenerator connected to receive the combustion products from said secondary boiler, said regenerator also being connected between said compressor and said combustor whereby said regenerator transfers heat from the combustion products to the compressed air.

3. The heat engine defined in claim 1 including:

a coal gasifier connected to receive compressed air from said compressor to pressurize the process of conversion of coal into gaseous fuel; and means to conduct the gaseous fuel to said combustor for burning.

* * * * *